Patented May 14, 1946

2,400,337

UNITED STATES PATENT OFFICE 2,400,337

MYCALEX PRODUCTS

Guenther Buechner, Scotia, N. Y., assignor to General Electric Company, a corporation of New York No Drawing. Application July 1, 1942, Serial No. 449,328

6 Claims. (Cl. 106—46)

The present invention comprises improved composite vitreous products comprising one or more natural silicates of high fusibility, such for example as mica, and a bonding agent consisting of vitreous material of materially lower fusibility.

It is the object of my invention to improve the plasticity when hot and other physical properties of such products, and to reduce the loss of energy therein when functioning as a dielectric in the high frequency field. Another desirable improvement, not restricted to the electrical insulating field, is the improved homogeneity of structure and smoothness of surface of products embodying my invention. A rough disintegrating surface texture, known as "chalkiness," which is characteristic of some forms of composite vitreous products heretofore made, is replaced as a consequence of my invention by a smooth hard surface which is essentially waterproof.

In accordance with my invention, these and other desirable results are obtained by employing for mica composition a bonding agent consisting of lead borate associated with a fluorine-yielding material, such as the mineral cryolite, or an equivalent fluorine-containing compound, for example fluosilicate or a fluoride of an alkali metal.

A product consisting of finely divided mica and a vitreous bonding agent is described by L. E. Barringer in the General Electric Review, Volume 34, 406, July 1931. This product is known in the industrial field as Mycalex, and is molded in a variety of shapes with or without embedded metal inserts. Mycalex has been used for a wide variety of purposes, for example, as electrical insulators, heat-resisting parts such as arc chutes, and insulating seals for vacuum tubes.

The vitreous bonding agent of Mycalex commonly has consisted of lead borate. It has been suggested heretofore to modify a lead borate bond by the addition of a combination of various ingredients, including silica, silicates, cryolite and other ingredients. Such complex mixtures do not have the properties obtained in accordance with my invention. It is possible that the reactive effect of the cryolite on the mica was counteracted by the silicic ingredients.

I have discovered improved surface finish and, in general, improved physical properties are obtained by employing as a bond unmodified lead borate with which a quantity of raw cryolite, or an equivalent sodium-aluminum fluoride, is associated in the absence of silicic additions.

Lead borate glass may be prepared by heating a mixture consisting by weight of two parts lead oxide (litharge) and one part hydrous boric acid to reaction temperature, 800° C. being satisfactory. The resulting lead borate is ground and intimately mixed with about 5 to 8 per cent by weight of ground raw cryolite, or equivalent fluorine compound. This non-siliceous mixture is employed as a bond for a desired amount of comminuted mica. The proportions of mica and bonding ingredients may be widely varied. Good results can be obtained when about 50 to 75 parts of ground mica, ordinarily muscovite, are mixed with 50 to 25 parts of a composition of lead borate and comminuted fluoride. Such a mixture has greater plasticity when heated to molding temperatures than a mixture consisting solely of mica and lead borate. A molding temperature of about 625° C. may be employed.

Although with somewhat diminished effectiveness, the cryolite, or an equivalent mixture of sodium and aluminum fluorides, may be added prior to reaction to the mixture of litharge and boric acid, but in the absence of other modifying ingredients. The bonding glass then is prepared by the fusion of the mixed ingredients. Ordinarily the first-described mixture of powdered lead borate and the raw powdered cryolite is preferred.

The finely divided mica mixed with the borate-cryolite bonding composition is heated to a temperature of plasticity, ordinarily about 625° C. or above, and molded under pressure while hot to form objects of desired configuration.

The molds preferably are heated to about 400 to 450° C. The molded article may be transferred to a second mold which is maintained at a lower temperature. The described molding composition may be introduced into a heated mold by injection molding technique. Preferably the heated mixture is maintained under molding pressure for at least about a minute before being removed from the high temperature to the low temperature mold. The dwell in the low temperature mold ordinarily will be governed by the configuration of the molded product.

The molded articles not only have the improved surface and the other desirable characteristics above-noted, but also have improved moisture-resistance.

What I claim as new and desire to secure by Letters Patent of the United States is:

1. The vitrified product of a homogeneous mixture consisting solely of (1) finely divided mica and (2) a finely divided non-siliceous bonding agent, the latter consisting of lead borate and a fluorine compound of an alkali metal in intimate association.

2. A substantially homogeneous product consisting of the heat-converted product of a homogeneous mixture consisting solely of (1) mica in a finely divided state and (2) a bonding agent for (1) consisting of (a) finely divided lead borate and (b) finely divided raw cryolite.

3. Electrical insulation consisting of a heat-treated product of a homogeneous mixture consisting solely of the following ingredients all in a finely divided state: (1) a preponderant amount of mica and (2) a lesser amount of a bonding agent for (1) consisting of lead borate and cryolite, said cryolite constituting, by weight, about 5 to 8 per cent of the lead borate.

4. The method of making a vitreous material consisting preponderantly of mica, which consists in intimately mixing with said mica a bonding agent composed of lead borate and raw cryolite, all ingredients being comminuted, heating the mixture to a temperature at least as high as about 625° C., and molding the resulting product in plastic state at a lower temperature.

5. The method of fabricating a vitreous insulating material which consists in mixing about 50 to 75 parts of comminuted mica with about 50 to 25 parts of a bonding agent consisting solely of unmodified lead borate and about 5 to 8 per cent of raw cryolite, heating said mixture to a plasticity temperature of about 625° C. and molding the resulting product in plastic state at a temperature of about 400° to 450° C.

6. A Mycalex product having a smooth, hard surface which is essentially waterproof, said product resulting from molding under pressure at an elevated temperature of plasticity a mixture consisting of the following ingredients in finely divided state: mica constituting about one half to three-fourths of the mixture, the remainder consisting of a bonding agent consisting of a mixture of comminuted lead borate and about 5 to 8 per cent of raw cryolite.

GUENTHER BUECHNER.